US010401474B2

United States Patent
Schwendimann et al.

(10) Patent No.: US 10,401,474 B2
(45) Date of Patent: Sep. 3, 2019

(54) SENSOR ARRAY

(71) Applicant: Baumer Electric AG, Frauenfeld (CH)

(72) Inventors: Mathias Schwendimann, Neuhausen (CH); Valentin Kunz, Winterthur (CH)

(73) Assignee: Baumer Electric AG, Frauenfeld (CH)

( * ) Notice: Subject to any disclaimer, the term of this patent is extended or adjusted under 35 U.S.C. 154(b) by 307 days.

(21) Appl. No.: 15/355,858

(22) Filed: Nov. 18, 2016

(65) Prior Publication Data

US 2017/0146637 A1 May 25, 2017

(30) Foreign Application Priority Data

Nov. 23, 2015 (DE) .......................... 10 2015 015 034

(51) Int. Cl.
G01S 7/03 (2006.01)
H01Q 1/32 (2006.01)
H01Q 19/06 (2006.01)
G01S 7/02 (2006.01)

(52) U.S. Cl.
CPC ............... *G01S 7/032* (2013.01); *G01S 7/03* (2013.01); *G01S 2007/027* (2013.01); *H01Q 1/3233* (2013.01); *H01Q 19/062* (2013.01)

(58) Field of Classification Search
CPC ..... G01S 7/032; G01S 2007/027; H01Q 1/32; H01Q 1/3233; H01Q 1/42; H01Q 19/06; H01Q 19/062
See application file for complete search history.

(56) References Cited

U.S. PATENT DOCUMENTS

| 5,451,970 A * | 9/1995 | Cole | B60Q 1/0023 343/711 |
| 5,455,589 A * | 10/1995 | Huguenin | G01S 7/032 342/175 |
| 5,926,127 A * | 7/1999 | Schmidt | G01S 7/032 342/175 |
| 5,955,752 A * | 9/1999 | Fukaya | G01S 7/032 257/275 |

(Continued)

FOREIGN PATENT DOCUMENTS

| DE | 19621075 C1 | 2/1998 |
| DE | 19703095 C1 | 6/1998 |

(Continued)

OTHER PUBLICATIONS

Bosch: "Adaptive Fahrgeschwindigskeitsregelung ACC", Bosch Kraftfahrzeugtechnick—Technische Unterrichtung, Apr. 1, 2002 (Apr. 1, 2002), Seite 81pp, XP007907314.

*Primary Examiner* — Peter M Bythrow
(74) *Attorney, Agent, or Firm* — McGlew and Tuttle, P.C.

(57) ABSTRACT

A sensor array includes a housing with a circumferential housing wall, which defines a housing opening, with a sensor circuit board with a high-frequency sensor. The sensor circuit board in the housing is arranged such that the high-frequency sensor is directed towards the housing opening. A one-piece closing cap closes the housing. The one-piece closing cap has a circumferential cap wall and a high-frequency lens. The high-frequency lens closes the circumferential cap wall on the front side and is directed towards the housing opening. A distance between the high-frequency lens and the high-frequency sensor and thus a focal length is predefined by a lateral length of the cap wall.

20 Claims, 4 Drawing Sheets

(56) References Cited

U.S. PATENT DOCUMENTS

| | | | | |
|---|---|---|---|---|
| 5,991,474 A * | 11/1999 | Baldi | G01S 7/032 | 342/153 |
| 6,008,750 A * | 12/1999 | Cottle | G01S 7/032 | 342/42 |
| 6,037,894 A * | 3/2000 | Pfizenmaier | G01S 7/032 | 342/128 |
| 6,075,492 A * | 6/2000 | Schmidt | H01Q 1/3233 | 343/753 |
| 6,322,275 B1 * | 11/2001 | Schmidt | B60R 19/483 | 403/14 |
| 6,366,245 B1 * | 4/2002 | Schmidt | G01S 7/032 | 343/700 MS |
| 6,501,417 B1 * | 12/2002 | Bowlds | G01S 7/032 | 342/104 |
| 6,600,103 B1 * | 7/2003 | Schmidt | G01S 7/032 | 174/559 |
| 6,674,392 B1 * | 1/2004 | Schmidt | G01S 13/931 | 342/70 |
| 6,674,412 B1 * | 1/2004 | Schmidt | H01Q 1/42 | 342/70 |
| 6,891,513 B2 | 5/2005 | Kienzle | | |
| 8,444,290 B2 | 5/2013 | Opolka | | |
| 9,373,885 B2 * | 6/2016 | Huerta | H01Q 21/0087 | |
| 9,768,517 B2 * | 9/2017 | Binzer | G01S 13/931 | |
| 2001/0013842 A1 * | 8/2001 | Ishikawa | G01S 7/032 | 343/912 |
| 2005/0007777 A1 | 1/2005 | Klipstein et al. | | |
| 2005/0105075 A1 * | 5/2005 | Gottwald | G01S 7/032 | 356/4.01 |
| 2007/0115196 A1 * | 5/2007 | Motzer | G01F 23/284 | 343/786 |
| 2008/0111752 A1 * | 5/2008 | Lindackers | H01Q 1/3275 | 343/713 |
| 2008/0129620 A1 * | 6/2008 | Zurowski | H01Q 1/1214 | 343/713 |
| 2010/0141534 A1 * | 6/2010 | Sato | H01Q 1/12 | 343/702 |
| 2012/0262331 A1 * | 10/2012 | Kienzle | B29C 45/2624 | 342/124 |
| 2014/0047917 A1 * | 2/2014 | Vogt | G01F 23/284 | 73/290 V |
| 2015/0022389 A1 * | 1/2015 | Binzer | G01S 13/931 | 342/1 |
| 2015/0241261 A1 * | 8/2015 | Cheng | G01F 23/284 | 342/124 |
| 2015/0253421 A1 * | 9/2015 | Matsumura | G01S 7/032 | 342/104 |
| 2016/0033638 A1 * | 2/2016 | Silc | G01S 13/867 | 342/55 |

FOREIGN PATENT DOCUMENTS

| | | |
|---|---|---|
| DE | 19710811 A1 | 9/1998 |
| DE | 19961387 A1 | 6/2001 |
| DE | 19963003 | 6/2001 |
| DE | 202010011734 U1 | 11/2011 |
| DE | 10 2012 202 913 A1 | 8/2013 |
| DE | 102012202913 A1 | 8/2013 |
| DE | 102012111183 A1 | 5/2014 |
| GB | 2313486 | 11/1997 |
| WO | 0125818 A1 | 4/2001 |

\* cited by examiner

SENSOR ARRAY

CROSS REFERENCE TO RELATED APPLICATIONS

This application claims the benefit of priority under 35 U.S.C. § 119 of German Application 10 2015 015 034.0 filed Nov. 23, 2015, the entire contents of which are incorporated herein by reference.

FIELD OF THE INVENTION

The present invention pertains to a sensor array.

BACKGROUND OF THE INVENTION

Radar sensors can be used for detecting a remote object as well as for measuring a distance and speed of an object. In this case, the measurement is carried out by means of an emission of radar radiation in the direction of the object and a detection of a reflection of the radar radiation at the object.

Radar sensors comprise, as a rule, a radar sensor element, which is arranged on an electric circuit board, the circuit board usually being enclosed by an opaque sensor housing. A precise alignment of the radar sensor element to a remote object is, however, difficult because of the opacity of the housing and possible irregularities in the positioning of the radar sensor element in the housing.

A radar sensor, in which a focal length is determined by the sensor housing and the lens, is known from DE 10 2012 20 29 13 A1. The precision of the focal length depends, further, on the tolerance of the housing and on the screw-in depth of the lens as well as on the fastening of the sensor circuit board.

SUMMARY OF THE INVENTION

The object on which the present invention is based is to create an efficient sensor array, which can be manufactured in a simple manner.

According to a first aspect, the present invention pertains to a sensor array with a housing with a circumferential housing wall, which defines a housing opening, with a sensor circuit board with a high-frequency sensor. The sensor circuit board is arranged in the housing such that the high-frequency sensor is directed towards the housing opening, with a one-piece closing cap for closing the housing. The one-piece closing cap has a circumferential cap wall and a high-frequency lens. The high-frequency lens closes the circumferential cap wall on the front side and is directed towards the housing opening and a distance between the high-frequency lens and the high-frequency sensor is predefined by the lateral length of the cap wall.

The focal length is thus advantageously predefined by the distance of the lateral length of the cap wall. The desired focal length, which is determined by the distance between the high-frequency lens and the high-frequency sensor, defines the lateral length of the cap wall. The lateral length of the cap wall extends from the cap lateral length facing away from the high-frequency lens up to the front-side closure of the high-frequency lens at the circumferential cap wall.

The advantage is thereby achieved that the high-frequency lens can focus the high-frequency signal efficiently in the direction of the high-frequency sensor. In addition, it is possible to manufacture the sensor in a simple manner. Sensor arrays according to the present application can be obtained in a simple manner due to the advantageous variation of the lateral length of the cap wall.

Another advantage arises in a greater manufacturing tolerance of the individual parts of the sensor array.

The housing may have a round cross section. The housing may comprise a flange or an outer thread for fastening the sensor array. Further, the housing may have a tapering of the housing diameter on the side facing away from the housing opening. The tapering may have an electrical connection, especially an electrical plug-in connection, for connecting a line arrangement or be configured as an electrical connection element.

The housing wall may be formed from an electrically conductive or electrically insulating material, for example, a plastic material.

The sensor circuit board may be an electrical circuit board, for example, a circuit board comprising a substrate with a Flexprint coating. The sensor circuit board may be connected to another circuit board. The other circuit board may be arranged in the housing lengthwise to the housing wall, and may connect, especially electrically, the sensor circuit board to the electrical connection on the side of the housing facing away from the housing opening. The other circuit board may have electronic components for actuating and reading the high-frequency sensor, as well as for the energy supply thereof.

The high-frequency sensor may be configured for sending and receiving high-frequency radiation, especially radar radiation. The high-frequency sensor may comprise a sending element for sending the high-frequency radiation and a receiving element for receiving the high-frequency radiation. The high-frequency radiation may have a frequency of 121 GHz or 61 Ghz.

According to one embodiment, the circumferential wall positions and fixes the sensor circuit board in the housing with a cap wall edge facing away from the high-frequency lens. The advantage is thereby achieved that the sensor circuit board can be efficiently fixed in the sensor array at a fixed distance and angle to the high-frequency lens.

According to another embodiment, the cap wall edge facing away from the high-frequency lens has extensions that are spaced apart from one another and have a nub-shaped configuration.

The housing comprises a circumferential projection for accommodating the sensor circuit board transversely to a direction of extension of the housing or parallel to the housing opening according to one embodiment, wherein an elastic sealing lip, especially an elastic sealing ring, is arranged between the circumferential projection and the sensor circuit board. The advantage is thereby achieved that the sensor circuit board can be fixed efficiently in the sensor array. Irregularities in the spacing of the housing, of the closing cap and of the sensor circuit board can be compensated with the elastic sealing lip and higher manufacturing tolerances of the sensor array are thus achieved.

The elastic sealing lip or the elastic sealing ring may be an O-ring.

According to one embodiment, a sealing lip is arranged between the circumferential cap wall and the housing wall. The sealing lip may be another elastic sealing ring, especially another O-ring. The advantage is thereby achieved that an efficient and tight, especially watertight and/or airtight, closing of the housing with the closing cap is made possible.

According to one embodiment, a circumferential groove is formed in the circumferential cap wall, wherein the sealing lip is arranged in the circumferential groove, or a circumferential groove is formed in the housing wall, wherein the sealing lip is arranged in the circumferential groove. The advantage is thereby achieved that the sealing lip can be efficiently arranged between the cap wall and the housing wall.

According to one embodiment, the one-piece closing cap is connected to the housing in a nonpositive manner, especially by means of a thread meshing, or in a positive-locking manner, especially by means of a snap-in connection. The advantage is thereby achieved that the closing cap can be mounted on the housing in an efficient and stable manner.

According to one embodiment, the circumferential cap wall has an outer thread, wherein the housing wall has an inner thread, and wherein the cap wall is screwed into the housing wall. The advantage is thereby achieved that the closing cap can be mounted on the housing in an efficient and stable manner.

According to one embodiment, the one-piece closing cap is formed in one piece from plastic. The closing cap may be formed from a polyamide plastic. Further, the closing cap may be manufactured by means of an injection molding process or a turning process.

According to one embodiment, the high-frequency lens is formed to focus a high-frequency signal in the direction of the high-frequency sensor. The advantage is achieved thereby that the high-frequency sensor can efficiently detect the high-frequency signal.

According to one embodiment, the housing has a sleeve-like shape, wherein the sensor circuit board is arranged transversely to a longitudinal direction of the housing.

The one-piece closing cap may be configured as translucent or transparent to light. In one this embodiment of the one-piece closing cap, at least one colored LED can be provided for the optical display of an operating state of the sensor array, which displays the operating state of the sensor array visible through the closing cap, which is translucent or transparent to light, in case of the sensor array closed with the closing cap. In another embodiment, the sensor array may have a laser adjustment aid, which, analogously to the at least one colored LED, is visible through the closing cap, which is translucent or transparent to light. The sensor circuit board preferably has the at least one colored LED and/or the laser adjustment aid.

The advantage is thereby achieved that the at least one colored LED and/or laser adjustment aid is visible through the closing cap, which is translucent or transparent to light.

According to one embodiment, the high-frequency lens extends from the circumferential cap wall spherically outwards. The advantage is thereby achieved that the high-frequency lens can efficiently focus the high-frequency signal in the direction of the high-frequency sensor.

According to one embodiment, the circumferential cap wall is sleeve-shaped.

According to one embodiment, the circumferential cap wall is enclosed in at least some sections by a circumferential wall collar, wherein the housing wall is accommodated between the circumferential wall collar and the cap wall. The advantage is thereby achieved that the closing cap can be efficiently mounted on the housing.

Exemplary embodiments of the present invention are shown in the drawings and are described below in greater detail. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
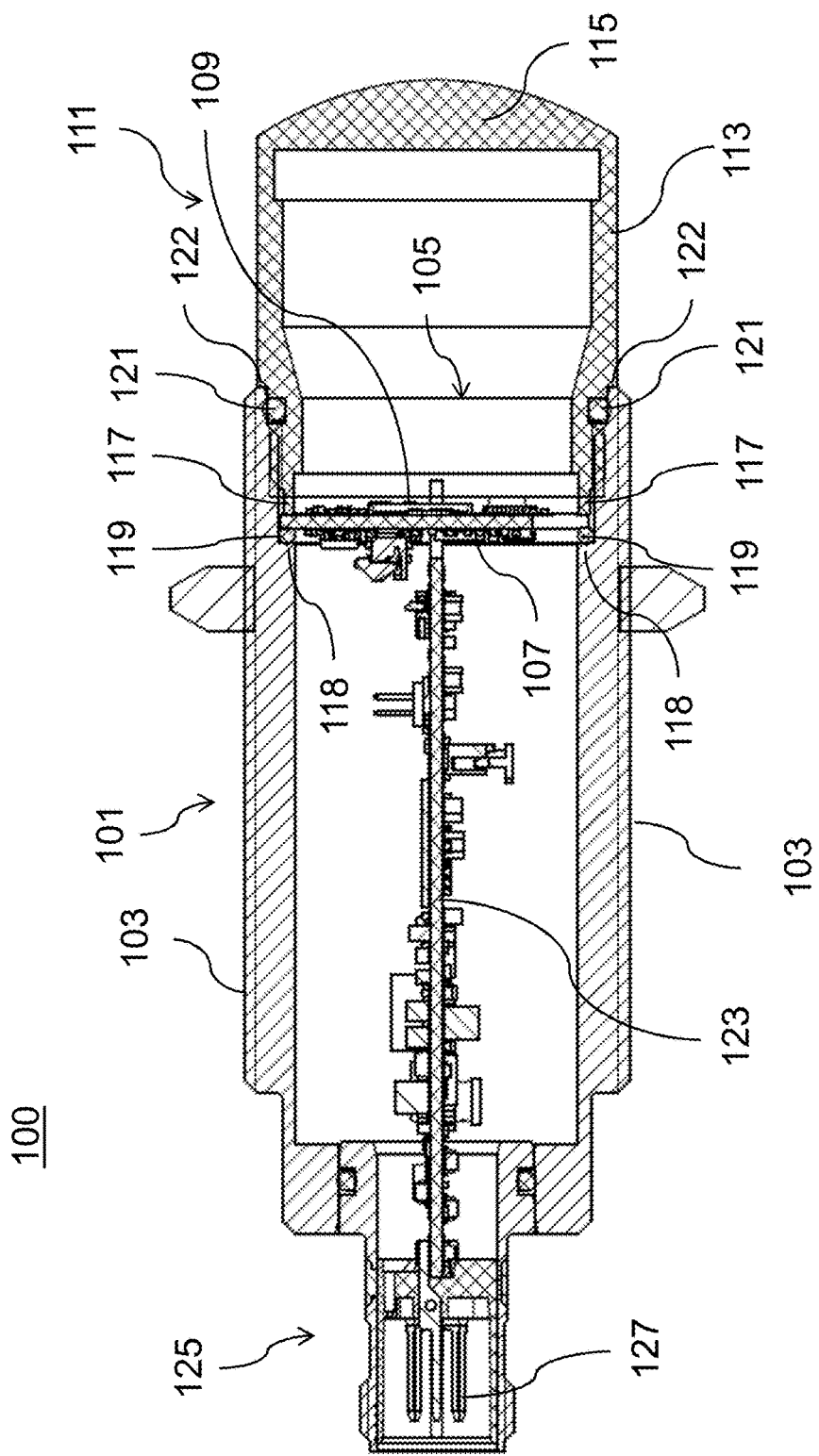
FIG. 1 is a cross-sectional view of a sensor array.

Referring to the drawings, FIG. 1 shows a cross-sectional view of a sensor array 100 according to one embodiment.

The sensor array 100 comprises a housing 101 with a circumferential housing wall 103 that defines a housing opening 105, a sensor circuit board 107 with a high-frequency sensor 109, wherein the sensor circuit board 107 is arranged in the housing 101 such that the high-frequency sensor 109 is directed towards the housing opening 105, with a one-piece closing cap 111 for closing the housing 101, wherein the one-piece closing cap 111 has a circumferential cap wall 113 and a high-frequency lens 115, wherein the high-frequency lens 115 closes the circumferential cap wall 113 on the front side and is directed towards the housing opening 105.

The distance between the high-frequency lens 115 and the high-frequency sensor 109 is predefined by a lateral length 114 (FIG. 4) of the cap wall 113.

The housing 101 may have a round cross section. The housing 101 may comprise a flange or an outer thread for fastening the sensor array 100. Further, the housing 101 may have a tapering 125 of the housing diameter on the side facing away from the housing opening 105. The tapering 125 may have an electrical connection 127, especially an electrical plug-in connection, for connecting a line arrangement or may be configured as an electrical connection element.

The housing wall 103 may be formed from an electrically conductive or electrically insulating material, for example, a plastic material.

The sensor circuit board 107 may be an electrical circuit board, for example, a circuit board comprising a substrate with a Flexprint coating. The sensor circuit board 107 may be connected to another circuit board 123. The other circuit board 123 may be arranged in the housing 101 lengthwise to the housing wall and may connect, especially electrically connect, the sensor circuit board 107 to the electrical connection 127 on the side of the housing 101 facing away from the housing opening 105. The other circuit board 123 may have electronic components for actuating and reading the high-frequency sensor 109, as well as for the energy supply thereof.

The high-frequency sensor 109 may be configured for sending and receiving high-frequency radiation, especially radar radiation. The high-frequency sensor 109 may comprise a sending element for sending the high-frequency radiation and a receiving element for receiving the high-frequency radiation. The high-frequency radiation may have a frequency of 121 GHz or 61 Ghz.

The housing 101 may have a circumferential projection 118 for accommodating the sensor circuit board 107. In this connection, the sensor circuit board 107 may be arranged transversely to the direction of extension of the housing and/or parallel to the housing opening 105.

The circumferential cap wall 113 may have a cap wall edge 117 on the side of the one-piece closing cap 111 facing away from the high-frequency lens 115. The sensor circuit board 107 may be fixed between the cap wall edge 117 of the circumferential cap wall 113 and the circumferential projection 118 of the housing 101. In this case, the sensor circuit board 107 may be fixed at a fixed distance to the high-frequency lens 115.

An elastic sealing lip 119, especially an elastic sealing ring, may be arranged between the circumferential projection 118 and the sensor circuit board. Irregularities in the spacing of the housing 101, of the one-piece closing cap 111 and of the sensor circuit board 107 may be compensated with the elastic sealing lip and thus higher manufacturing tolerances of the sensor array 100 may be achieved.

The elastic sealing lip 119 or the elastic sealing ring may be an O-ring.

According to one embodiment of the sensor array 100, another sealing lip 121 is arranged between the circumferential cap wall 113 and the housing wall 103. A circumferential groove may be formed in the circumferential cap wall 113 and/or in the housing wall 103 for accommodating the other sealing lip 121. The other sealing lip 121 may be arranged in the circumferential groove.

The other sealing lip 121 may be another elastic sealing ring, especially another O-ring. A watertight and/or airtight closing of the housing 101 with the one-piece closing cap 111 can be made possible with the other sealing lip 121.

According to one embodiment, the one-piece closing cap 111 is connected to the housing 101 in a nonpositive manner, especially by means of a thread meshing, or in a positive-locking manner, especially by means of a snap-in connection.

The circumferential cap wall 113 may have an outer thread and the housing wall 103 may have an inner thread. The cap wall 113 may be screwed into the housing wall 103.

Further, the circumferential cap wall 113 may be enclosed in at least some sections by a circumferential wall collar 122, wherein the housing wall is accommodated between the circumferential wall collar 122 and the cap wall 113.

Figure 2:
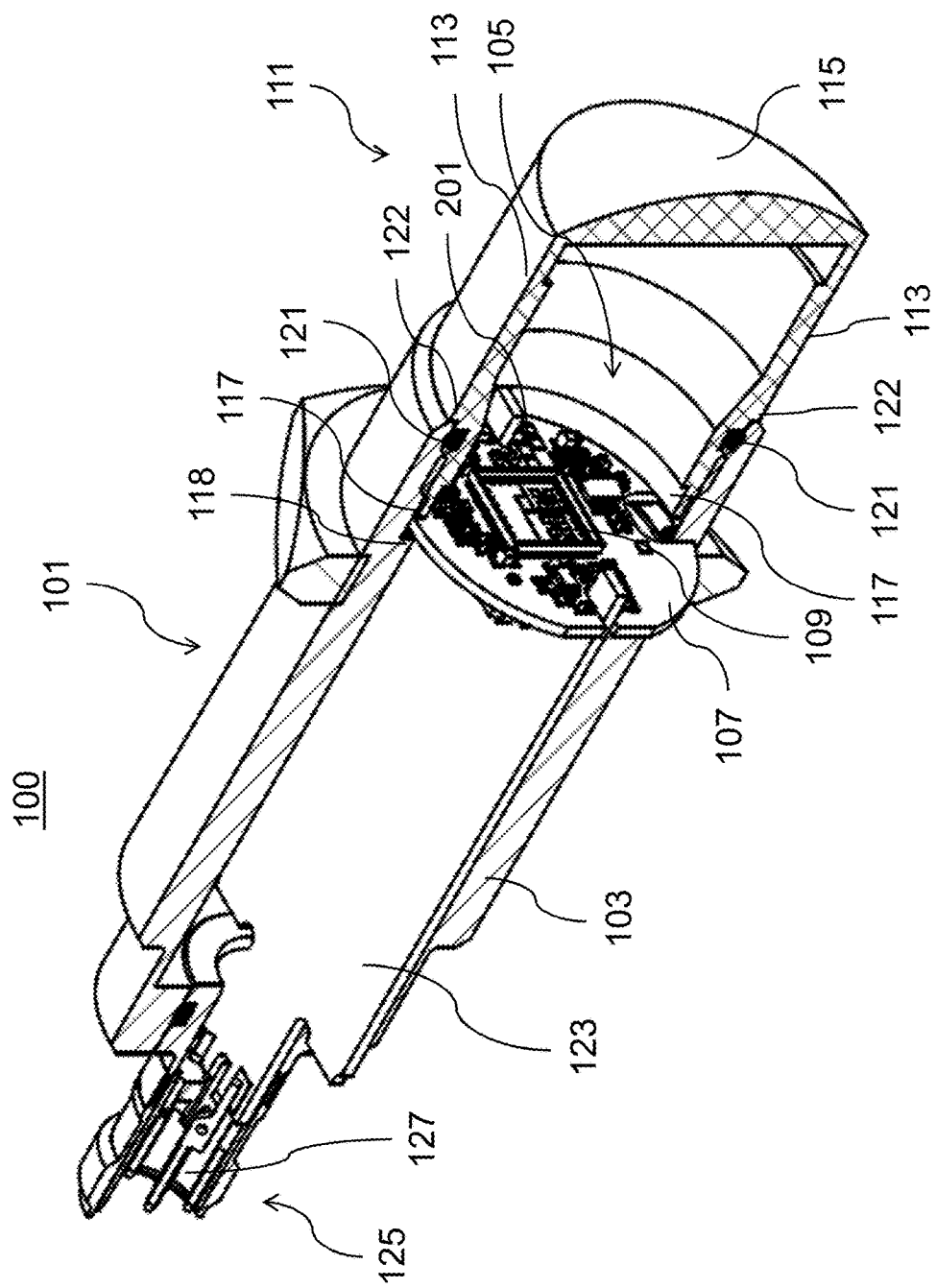
FIG. 2 is a perspective cross-sectional view of a sensor array.

FIG. 2 shows a cross-sectional view of the sensor array 100 according to one embodiment.

In FIG. 2, the sensor circuit board 107 is arranged parallel to the housing opening 105 and transversely to the direction of extension of the housing 101. The high-frequency sensor 109 is arranged centrally in the sensor circuit board 107 in FIG. 2 and is directed towards the housing opening 105.

In addition to the high-frequency sensor 109, the sensor circuit board 107 may have at least one colored LED 201. The colored LED 201 may be configured to optically display an operating state of the sensor array 100. Further, the sensor circuit board 107 may have adjustment marks, especially laser adjustment aids (not shown).

The one-piece closing cap 111 may be translucent or transparent to light. Thus, the at least one colored LED 201 and/or the laser adjustment aids may be visible through the transparent closing cap 111 in case of a sensor array 100 closed with the closing cap 111. This can make possible an adjustment, especially a laser adjustment, of the sensor array 100 closed with the closing cap 111 by means of the laser adjustment aids. In addition, a checking of the operating state of the closed sensor array 100 displayed by the colored LED 201 can be carried out.

Figure 3:
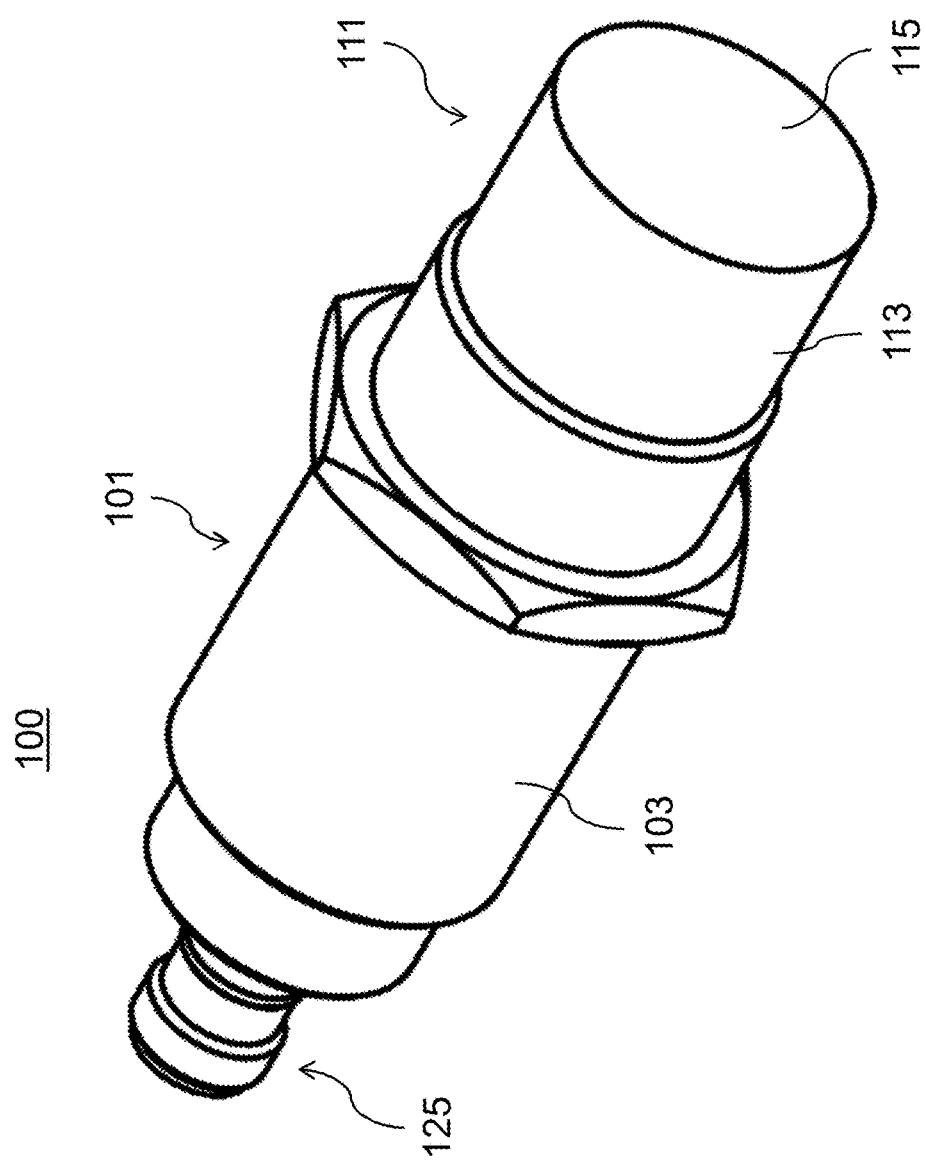
FIG. 3 is a perspective view of a sensor array.

FIG. 3 shows a schematic view of the sensor array 100 according to one embodiment.

The housing 101 and/or the closing cap 111 may have a round cross section. Further, the housing 100 or the housing wall 103 and/or the closing cap 111 or the circumferential cap wall 113 may be sleeve-shaped.

The one-piece closing cap 111 may be formed from a translucent material. The one-piece closing cap 111 may be formed in one piece from plastic, especially a partly transparent plastic. The closing cap 111 may be formed from a polyamide plastic. The closing cap 111 may be manufactured by means of an injection molding process or a turning process.

The housing 101 and the closing cap 111 may be formed from the same material.

According to one embodiment, the sensor array 100 is watertight and/or airtight.

Figure 4:
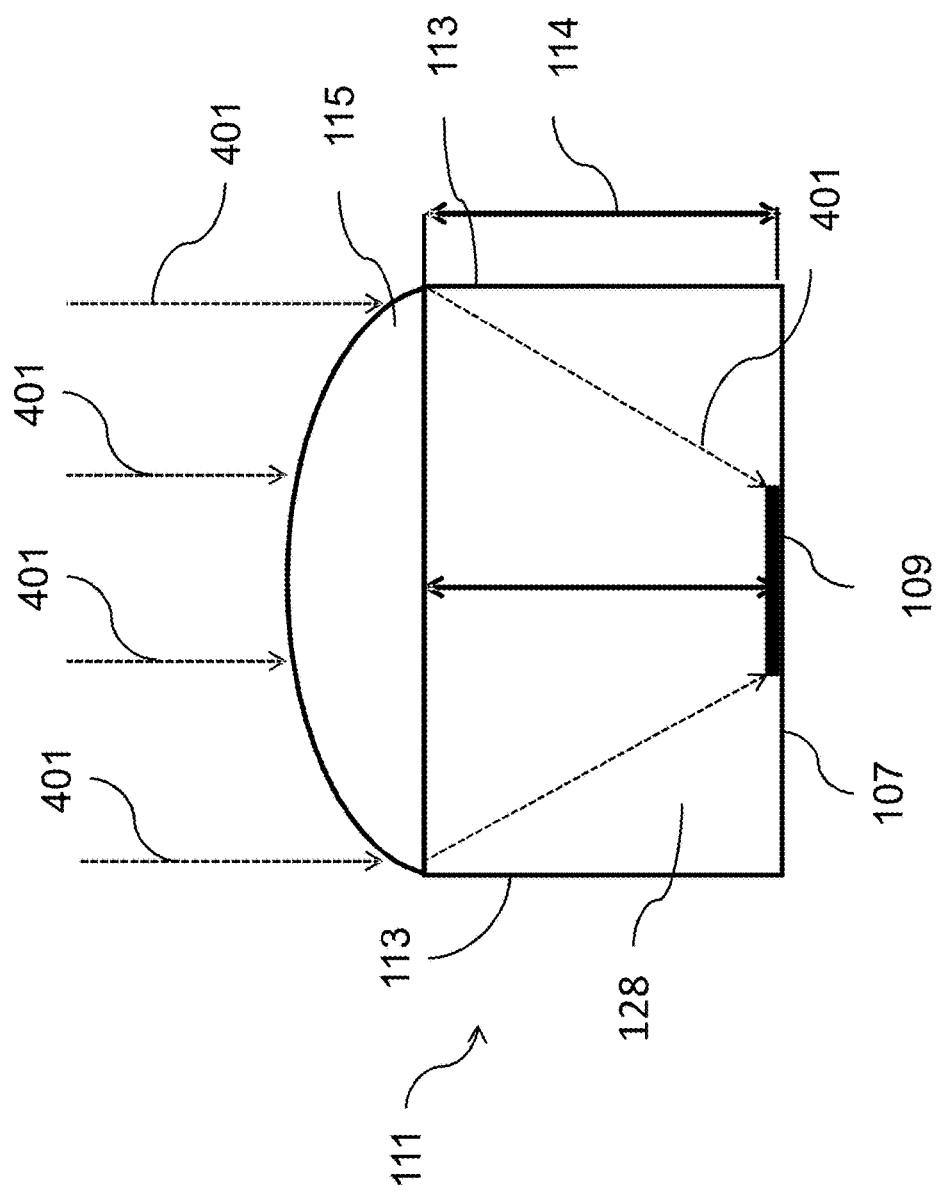
FIG. 4 is a schematic cross-sectional view of a one-piece closing cap of a sensor array.

FIG. 4 shows a cross-sectional view of the one-piece closing cap 111 of the sensor array 100 according to one embodiment.

The one-piece closing cap 111 for closing the housing 101 has a circumferential cap wall 113 and a high-frequency lens 115, wherein the high-frequency lens 115 closes the circumferential cap wall 113 on the front side and is directed towards the housing opening 105.

A distance between the high-frequency lens 115 and the high-frequency sensor 109 is predefined by a lateral length 114 (FIG. 4) of the cap wall 113.

The focal length 128 is thus advantageously predefined by the distance of the lateral length of the cap wall 113. The desired focal length 128, which is determined by the distance between the high-frequency lens 115 and the high-frequency sensor 109, defines the lateral length 114 of the cap wall 113. The lateral length 114 of the cap wall 113 extends from the cap wall edge 117 facing away from the high-frequency lens up to the front-side closure of the high-frequency lens at the circumferential cap wall 113.

In FIG. 4, the high-frequency lens 115 extends from the circumferential cap wall 113 spherically outwards. In this case, the high-frequency lens is arranged at a distance of its focal length 128 to the high-frequency sensor 109.

The high-frequency lens 115 may focus a radiating high-frequency signal 401 on the high-frequency sensor. Due to the focusing, a signal strength, especially a signal intensity or an amplitude, of the high-frequency signal 401 radiating on the high-frequency sensor 109 can be increased, as a result of which a detection signal of the high-frequency sensor 109 can be increased.

According to one embodiment, the high-frequency lens 115 is formed to direct, especially parallel, another high-frequency signal, which is sent by the high-frequency sensor 109.

The high-frequency signal 401 may be a reflection of the other high-frequency signal sent at an object. The sensor array 100 may be configured to detect a distance of the object to the sensor array 100 on the basis of a travel time between a sending of the other high-frequency signal and a receiving of the high-frequency signal 401. Further, the sensor array 100 may be configured to detect the speed of the object on the basis of a difference in frequency between the high-frequency signal 401 and the other high-frequency signal.

The detection range of the sensor array 100 can be increased by the direction of the other high-frequency signal and/or the focusing of the high-frequency signal 401 with the high-frequency lens 115.

The high-frequency lens 115 may be partly transparent to light like the closing cap 111. The high-frequency lens 115 may also be completely transparent to light. Due to the magnification effect of the high-frequency lens 115, the colored LED 201 and/or the laser adjustment aid can be detected by a user better on the sensor circuit board 107.

The high-frequency lens 115 may be formed as a plano-convex, biconvex or concave-convex lens. Further, the high-frequency lens 115 may be formed as a Fresnel lens.

According to one embodiment, the high-frequency lens 115 extends from the circumferential cap wall spherically inwards. In this case, the high-frequency lens 115 may be formed as a plano-concave, biconcave or convex-concave lens.

The curvature of the high-frequency lens 115 may be optimized by taking into consideration a lens diameter, a lens material, which may especially be the polyamide plastic, and the frequency of the high-frequency radiation, in order to achieve an optimal focusing of the high-frequency signal 401 on the high-frequency sensor 109.

While specific embodiments of the invention have been shown and described in detail to illustrate the application of the principles of the invention, it will be understood that the invention may be embodied otherwise without departing from such principles.

The invention claimed is:

1. A sensor array comprising:
   a housing with a circumferential housing wall, which circumferential wall defines a housing opening;
   a sensor circuit board with a high-frequency sensor, wherein the sensor circuit board is arranged in the housing such that the high-frequency sensor is directed towards the housing opening;
   a one-piece closing cap closing the housing, wherein the one-piece closing cap has a circumferential cap wall and a high-frequency lens, wherein:
   the high-frequency lens closes the circumferential cap wall on a front side and is directed towards the housing opening;
   a distance between the high-frequency lens and the high-frequency sensor and thus a focal length is predefined by a lateral length of the cap wall;
   the circumferential housing wall comprises an inner circumferential projection for accommodating the sensor circuit board transversely to a direction of extension of the housing or parallel to the housing opening; and
   an elastic sealing ring, is arranged between the circumferential projection and the sensor circuit board.

2. A sensor array in accordance with claim 1, wherein the circumferential cap wall positions and fixes the sensor circuit board in the housing with a cap wall edge facing away from the high-frequency lens.

3. A sensor array in accordance with claim 2, wherein the cap wall edge, which is facing away from the high-frequency lens, has extensions which are spaced apart from one another and have a nub-shaped configuration.

4. A sensor array in accordance with claim 1, wherein another elastic sealing ring is arranged between the circumferential cap wall and the housing wall.

5. A sensor array in accordance with claim 4, wherein:
   a circumferential groove is formed in the circumferential cap wall, and wherein the other sealing lip is arranged in the circumferential groove; or
   a circumferential groove is formed in the housing wall, and wherein the other sealing lip is arranged in the circumferential groove.

6. A sensor array in accordance with claim 1, wherein the one-piece closing cap is connected to the housing in a nonpositive manner a thread meshing, or in a positive-locking manner a snap-in connection.

7. A sensor array in accordance with claim 1, wherein the housing has a sleeve shape, and wherein the sensor circuit board is arranged transversely to a longitudinal direction of the housing.

8. A sensor array in accordance with claim 1, wherein the one-piece closing cap is translucent or transparent to light.

9. A sensor array in accordance with claim 8, wherein at least one colored LED for optically displaying an operating state of the sensor array and/or a laser adjustment aid in the case of a sensor array closed with the closing cap is visible through the closing cap, which is translucent or transparent to light, and the sensor circuit board has the at least one colored LED and/or the laser adjustment aid.

10. A sensor array in accordance with claim 1, wherein the circumferential cap wall is enclosed in at least some sections by a circumferential wall collar, wherein the housing wall is accommodated between the circumferential wall collar and the cap wall.

11. A sensor array comprising:
    a housing comprising a circumferential housing wall, which circumferential housing wall defines a housing opening, and the housing defining a sensor circuit board accommodation surface;
    a sensor circuit board with a high-frequency sensor mounted in a set position relative to a sensor circuit board surface, wherein the sensor circuit board is arranged in the housing and is accommodated with respect to the sensor circuit board accommodation surface such that the high-frequency sensor is directed towards the housing opening; and
    a one-piece closing cap closing the housing opening, wherein the one-piece closing cap has a circumferential cap wall and a high-frequency lens, the high-frequency lens closing the circumferential cap wall on a front side and being directed towards the housing opening, the circumferential cap wall having a cap wall edge with a cap wall edge surface in contact with the sensor circuit board surface and the circumferential cap wall having a predefined circumferential cap wall lateral length, from the cap wall edge surface to the high-frequency lens, whereby a distance between the high-frequency lens and the high-frequency sensor is set based on the lateral length of the cap wall setting a position of the high-frequency lens relative to the sensor circuit board surface and relative to the high-frequency sensor mounted in the set position relative to the sensor circuit board surface.

12. A sensor array in accordance with claim 11, wherein the circumferential cap wall positions and fixes the sensor circuit board in the housing with the cap wall edge in direct contact with the sensor circuit board surface and the cap wall edge facing away from the high-frequency lens.

13. A sensor array in accordance with claim 12, wherein the cap wall edge, which is facing away from the high-frequency lens, has extensions which are spaced apart from one another and have a nub-shaped configuration.

14. A sensor array in accordance with claim 11, further comprising an elastic sealing ring, wherein:
    the circuit board accommodation surface of the housing comprises a circumferential projection for accommodating the sensor circuit board transversely to a direction of extension of the housing or parallel to the housing opening; and
    the elastic sealing ring, is arranged between the circumferential projection and the sensor circuit board.

15. A sensor array in accordance with claim 14, further comprising another elastic sealing ring wherein the other sealing ring is arranged between the circumferential cap wall and the housing wall, whereby an interior space of the one-piece closing cap and a cap facing side of the sensor circuit board with the high-frequency sensor mounted thereon are elastically sealed relative to an interior of the housing and with respect to an exterior of the housing and an exterior of the one-piece closing cap.

16. A sensor array in accordance with claim 15, wherein:
   a circumferential groove is formed in the circumferential cap wall, and wherein the other sealing ring is arranged in the circumferential groove; or
   a circumferential groove is formed in the housing wall and the other sealing ring is arranged in the circumferential groove.

17. A sensor array in accordance with claim 11, wherein:
   the housing has a tubular shape with a housing longitudinal extent; and
   the sensor circuit board is arranged transversely to the longitudinal extent of the housing.

18. A sensor array in accordance with claim 11, further comprising at least one colored LED or a laser adjustment aid mounted to the sensor circuit board surface, wherein:
   the one-piece closing cap is translucent or transparent; and
   the at least one colored LED and/or the laser adjustment aid is visible through the closing cap.

19. A sensor array in accordance with claim 11, wherein the circumferential cap wall is enclosed in at least some sections by a circumferential wall collar, wherein the housing wall is accommodated between the circumferential wall collar and the cap wall.

20. A sensor array comprising:
   a housing comprising a circumferential housing wall, which circumferential housing wall defines a housing opening and has an circumferential housing wall interior surface, the housing further defining a sensor circuit board accommodation surface;
   a sensor circuit board with a high-frequency sensor mounted in a set position relative to a sensor circuit board surface; and
   a one-piece closing cap closing the housing opening, wherein the one-piece closing cap comprises a circumferential cap wall and a high-frequency lens, the high-frequency lens closing the circumferential cap wall on a front side and being directed towards the housing opening, the circumferential cap wall having a cap wall edge with a cap wall edge surface in contact with the sensor circuit board surface and the circumferential cap wall having a predefined circumferential cap wall lateral length, from the cap wall edge surface to the high-frequency lens, whereby a distance between the high-frequency lens and the high-frequency sensor is set based on the lateral length of the cap wall setting a position of the high-frequency lens relative to the sensor circuit board surface and relative to the high-frequency sensor mounted in the set position relative to the sensor circuit board surface;
   a circuit board elastic sealing element engaging the sensor circuit board accommodation surface, the sensor circuit board being arranged in the housing and elastically and sealingly connected to the sensor circuit board accommodation surface via the circuit board elastic sealing element such that the high-frequency sensor is directed towards the housing opening;
   a closing cap elastic sealing element engaging the interior surface of the housing, the closing cap being elastically and sealingly connected to the interior surface of the housing via the elastic sealing element, whereby an interior of the one-piece closing cap and the sensor circuit board accommodation surface facing the interior of the one-piece closing cap are elastically sealed relative to an interior of the housing and with respect to an exterior of the housing and an exterior of the one-piece closing cap.

\* \* \* \* \*